United States Patent
Kobayashi et al.

(10) Patent No.: US 6,627,705 B2
(45) Date of Patent: Sep. 30, 2003

(54) VIBRATION DAMPING SILICONE COMPOSITION

(75) Inventors: Hideki Kobayashi, Chiba (JP); Masayuki Hayashi, Chiba (JP)

(73) Assignee: Dow Corning Toray Silicone Co., Ltd., Tokyo (JP)

(*) Notice: Subject to any disclaimer, the term of this patent is extended or adjusted under 35 U.S.C. 154(b) by 19 days.

(21) Appl. No.: 09/915,844

(22) Filed: Jul. 26, 2001

(65) Prior Publication Data

US 2002/0061958 A1 May 23, 2002

(30) Foreign Application Priority Data

Sep. 27, 2000 (JP) .......................... 2000-293667

(51) Int. Cl.$^7$ .............................................. C08L 83/00
(52) U.S. Cl. ......................................................... 525/477
(58) Field of Search .......................................... 525/477

(56) References Cited

U.S. PATENT DOCUMENTS

| | | | |
|---|---|---|---|
| 3,894,169 A | 7/1975 | Miller | 428/425 |
| 4,374,950 A | 2/1983 | Shimizu | 524/765 |
| 4,416,790 A | 11/1983 | Schurmann et al. | 252/62 |
| 4,514,529 A | 4/1985 | Beers et al. | 523/200 |
| 4,678,828 A | 7/1987 | Nakamura et al. | 524/265 |
| 5,342,721 A | 8/1994 | Akamatsu | 430/108 |
| 5,550,185 A | 8/1996 | Inoue et al. | 524/847 |
| 5,661,203 A | 8/1997 | Akamatsu et al. | 524/269 |
| 5,745,472 A | 4/1998 | Son | 369/263 |
| 5,840,220 A | 11/1998 | Akamatsu et al. | 264/15 |
| 5,856,396 A | 1/1999 | Vipperman | 524/425 |
| 6,347,411 B1 | 2/2002 | Darling | 2/272 |

FOREIGN PATENT DOCUMENTS

| | | | |
|---|---|---|---|
| EP | 0 635 549 B1 | 7/1994 | C08L/83/04 |
| EP | 0651020 A2 | 3/1995 | C08L/83/04 |
| EP | 0 990 816 A1 | 9/1999 | F16F/9/00 |
| JP | 10251517 A * | 9/1998 | |
| JP | 2000080277 A * | 3/2000 | |
| WO | WO 97/16480 | 9/1997 | C08K/3/26 |

OTHER PUBLICATIONS

JP 09–263525 A, Akiyama Y., Oct. 7, 1997 (abstract).*
JP10281202 Oct. 23, 1998 Japan (Abstract).
JP11182624 Jul. 6, 1999 Japan (Abstract).
JP62113932 May 25, 1987 Japan (Abstract).
JP080277 Mar. 21, 2000 Japan (Abstract).
JP63308241 Dec. 15, 1988 Japan (Abstract).
JP10251517 Sep. 22, 1998 Japan (Abstract).
U.S. application Ser. No. 09/994,503; Kobayashi et al.; filed Nov. 27, 2001.
U.S. application Ser. No. 09/891,901; Kobayashi et al.; filed Jun. 26, 2001.
U.S. application Ser. No. 09/891,899; Hayashi et al.; filed Jun. 26, 2001.
U.S. application Ser. No. 09/915,845; Kobayashi et al.; filed Jul. 26, 2001.
U.S. application Ser. No. 09/406,583; Tateishi et al.; filed Sep. 27, 1999.
U.S. application Ser. No. 09/846,834; Akamatsu et al.; filed May 1, 2001.
EP 0774488 –Abstract of equivalant DE19542157; Nov. 11, 1995.

* cited by examiner

Primary Examiner—Robert Dawson
Assistant Examiner—Marc S. Zimmer
(74) Attorney, Agent, or Firm—Jim L. De Cesare; Roger E. Gobrogga; Patricia M. Scaduto

(57) ABSTRACT

A vibration damping silicone composition of superior vibration damping properties and superior long-term storage stability contains (A) a silicone oil, and (B) a silicone resin powder. Component (B) is a solid at room temperature, and has a volatile component content of not more than one percent by weight, after being heated for two hours at 200° C.

6 Claims, No Drawings

VIBRATION DAMPING SILICONE COMPOSITION

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

This invention relates to a vibration damping silicone composition of superior vibration damping properties and storage stability.

BACKGROUND OF THE INVENTION

Vibration damping silicone compositions containing solid powders and viscous liquids such as silicone oil are known in the art. Some examples are (i) a vibration damping composition containing a silicone oil and a solid powder such as silica powder, glass powder, or silicone resin powder, as described in Japanese Patent Application Publication No. Sho 63(1988)-308241; (ii) a vibration damping silicone composition containing a silicone oil and silicone resin powder as described in Japanese Patent Application Publication No. Hei 10(1998)-251517; and (iii) a vibration damping compound containing a silicone oil, a polyorganosilsesquioxane resin powder, and a calcium carbonate powder as described in Japanese Patent Application Publication No. 2000-080277. However, these compositions typically undergo changes when stored over extended periods of time or used over extended periods of time, and as a result, their vibration damping properties are deteriorated.

BRIEF SUMMARY OF THE INVENTION

Therefore, this invention is directed to vibration damping silicone compositions of superior vibration damping properties and storage stability, based on the discovery that changes in vibration damping properties tend to occur over time, when the content of volatile components in certain silicone resin powders exceeds one percent.

These and other features of the invention will become apparent from a consideration of the detailed description.

BRIEF DESCRIPTION OF THE SEVERAL VIEWS OF THE DRAWING

Not applicable.

DETAILED DESCRIPTION OF THE INVENTION

Thus, the present invention relates to vibration damping silicone compositions containing (A) 100 parts by weight of a silicone oil; and (B) 10–300 parts by weight of a silicone resin powder that is a solid at room temperature. Component (B) has a volatile component content of not more than one percent by weight after being heated for two hours at 200° C.

Silicone oil component (A) functions as the matrix for dispersing the silicone resin powder component (B). The silicone oil is an organopolysiloxane that is in the liquid state at room temperature. Groups bonded to the silicon atoms in such organopolysiloxane silicone oils are typically monovalent hydrocarbon groups, representative of which are alkyl groups such as methyl, ethyl, and propyl; alkenyl groups such as vinyl, allyl, and butenyl; aryl groups such as phenyl and tolyl. Halogenated alkyl groups such as 3,3,3-trifluoropropyl can also be used. In addition, hydroxyl groups, or alkoxy groups such as methoxy, and ethoxy, can be substituted for some of the foregoing groups. Alkyl groups are preferable, however, particularly the methyl group, because such silicone oil compositions have a very low changes in viscosity based on temperature, and have excellent storage stability.

Component (A) can have a molecular structure which is linear, partially branched linear, branched, or cyclic. A linear structure is preferred. Component (A) should have a kinematic viscosity at 25° C. of 100–1,000,000 $mm^2$/s, preferably 500–500,000 $mm^2$/s. When the kinematic viscosity at 25° C. is less than 100 $mm^2$/s, it is difficult to maintain component (B) in a uniformly dispersed state in component (A). When it exceeds 1,000,000 $mm^2$/s, handling properties deteriorate, and component (B) becomes difficult to disperse in component (A).

Component (A) can be exemplified by dimethylpolysiloxanes end blocked with trimethylsiloxy groups, methyloctylpolysiloxanes end blocked with trimethylsiloxy groups, dimethylpolysiloxanes end blocked with silanol groups, and copolymers of methylphenylsiloxane and dimethylsiloxane end blocked with trimethylsiloxy groups.

To improve the storage stability and reliability of compositions prepared according to the invention, component (A) should contain no more than about 1,000 ppm, preferably no more than about 700 ppm, of any organosiloxane oligomers with less than 20 silicon atoms. Silicone oils most suitable as component (A) having a reduced content of oligomers can be produced by stripping silicone oils with oligomer contents of 10,000–40,000 ppm, after their ordinary equilibrium polymerization. For example, such oligomers can be removed by using thin film evaporators operating at 270–350° C. and 0.1–15 mm Hg; by extraction with alcohols such as methanol, ethanol, propanol, and butanol, or with ketones such as acetone and methylethylketone; or by known reprecipitation methods.

Solid silicone resin powder component (B) is used to improve the vibration damping properties of compositions prepared according to the invention. Its content of volatile components must not be more than one percent by weight, preferably not more than 0.7 percent by weight, more preferably not more than 0.5 percent by weight, and even more preferably not more than 0.3 percent by weight. As used herein, the term volatile component refers to low molecular compounds which can be volatilized when heated at 200° C. for two hours. In particular, it refers to moisture, alcohols, and low molecular weight siloxane oligomers. For example, when component (B) is a silicone resin powder containing silsesquioxane units in its main skeletal structure, branched siloxanes such as $(RSiO_{3/2})_4$ and $(RSiO_{3/2})_6$ represent some of the low molecular weight siloxane oligomers which should be removed. R is defined below.

Silicone resin powder component (B) can be an organopolysiloxane containing $RSiO_{3/2}$ units and/or $SiO_{4/2}$ units in the main skeleton structure. Component (B) may also contain $R_2SiO_{2/2}$ units and/or $R_3SiO_{1/2}$ units. An organopolysilsesquioxane powder containing $RSiO_{3/2}$ units is most preferable. In these unit formulas, R is a monovalent hydrocarbon group among which are alkyl groups such as methyl, ethyl, and propyl; alkenyl groups such as vinyl, allyl, and butenyl; and aryl groups such as phenyl and tolyl. R can also be a halogenated alkyl group such as 3,3,3-trifluoropropyl. In addition, some of these groups may be substituted by hydroxyl groups or alkoxy groups such as methoxy and ethoxy. Alkyl groups are preferred, in particular the methyl group, as such compositions possess a low degree of change in viscosity in response to temperature, and have excellent storage stability.

While R may be the same or different, at least 50 percent of the R groups are preferably methyl groups. While a small number of hydroxyl groups or alkoxy groups such as methoxy and ethoxy can be present at terminal ends in the molecular chain of the silicone resin powder, it is preferred that the number of such groups be very low as such groups generate volatile components, and it is necessary to the amount of volatile components to less than one percent by weight. Component (B) should have an average particle size of 0.1–100 μm, preferably 10–40 μm. The shape of the particles can spherical, oblate, or irregular.

The silicone resin powder component (B) can be produced by hydrolytically condensing chlorosilane or alkoxysilanes corresponding to the $RSiO_{3/2}$ units, $SiO_{4/2}$ units, $R_2SiO_{2/2}$ units, or $R_3SiO_{1/2}$ units, followed by washing, drying, and grading. For example, according to one process, a filtrate is obtained by placing methyltrichlorosilane in water, subjecting the filtrate to hydrolysis, and then washing and neutralizing the solution and carrying out filtration. It is then dried by heating and graded. The temperature used during the drying process is preferably 150–300° C., more preferably 200–300° C., and even more preferably 240–300° C. When the heating temperature is less than 150° C., the content of volatile components may exceed one percent by weight, and when it exceeds 300° C., oxidative degradation of the silicone resin powder may occur. Should the content of volatile components exceeds one percent by weight, solvent extraction and refining by re-precipitation can be used in conjunction with the adjustment in heating temperature.

The hygroscopicity, i.e., the weight increase ratio, of silicone resin powder component (B) is preferably not more than one percent, more preferably not more than 0.6 percent, as determined by maintaining it at a temperature of 25° C. and humidity of 95 percent for four hours. The amount of component (B) to be added per 100 parts by weight of component (A) can be in the range of 10–300 parts by weight, preferably 10–150 parts by weight. When the amount of component (B) is less than 10 parts by weight, the vibration damping properties of the composition of the invention tend to deteriorate, and when it exceeds 300 parts by weight, its operating properties deteriorate.

In addition to components (A) and (B), compositions according to the invention can include other components, among which are inorganic micropowders such as glass micropowder, silica micropowder, clay, bentonite, diatomaceous earth, and quartz powder; organic resin micropowders such as acrylic resin micropowder, fluororesin micropowder, and phenolic resin micropowder; anti-oxidants; rust preventatives; flame retardants; pigments; and dyes. The composition can be used in the form of a viscous liquid or semi-solid state at room temperature.

Compositions containing components (A) and (B) can be prepared by combining the ingredients and kneading them with a ball mill, a vibrating mill, a kneader-mixer, a screw extruder, a paddle mixer, a ribbon mixer, a Banbury mixer, a Ross mixer, a Henschel mixer, a flow jet mixer, a Hubbard mixer, or a roll mixer. Heating may be used during the mixing process, preferably at a temperature of 30–200° C. While the pressure used during mixing may be atmospheric, mixing under a reduced pressure is preferred.

The composition of the present invention has superior vibration damping properties, and its properties are little influenced by temperature fluctuations. Since it contains a silicone resin powder with a reduced content of volatile components, in comparison to other silicone resin powders, it has excellent long term storage stability. Because of these advantages, the composition can be used in shock absorbers prepared by filling elastic containers such as rubber bags or rubber cylinders with the composition. It is particularly suitable in shock absorbers used in electrical and electronic equipment in environments where there exist considerable temperature fluctuation, such as in compact disk players, compact disk changers, mini-disk players, and car navigation devices.

APPLICATION EXAMPLES

In the following application examples, kinematic viscosity is the value measured at 25° C. The vibration damping properties were evaluated by measuring a loss tangent coefficient (tan δ) at 25° C. The loss tangent coefficient (tan δ), the amount of volatile component in silicone resin powder component (B), and its hygroscopicity, were measured by the following methods.

Loss Tangent Coefficient (tan δ)

The coefficient was measured by the plate method using a Dynamic Analyzer Model RDA-700 of Rheometrix. The conditions under which measurements were conducted include a plate diameter of 20 mm, a frequency of 1 Hz, a strain of 10 percent, and a sample thickness of one mm.

Volatile Component Content (%)

Five gram of silicone resin powder were placed in a 50 cc beaker and heated for two hours in an air heating oven at 200° C. After cooling the powder in a desiccator, the content of volatile components was determined using the following formula.

$$\text{Volatile component content (\%)} = \frac{(\text{Weight after heating} - \text{Weight prior to heating})}{\text{Weight prior to heating}} \times 100 \quad \text{Formula 1}$$

Hygroscopicity, Weight Increase Ratio

The silicone resin powder was placed in a 45 mm Petri dish as a layer with a thickness of 5 mm. The dish was placed in a hygrostat at a temperature of 25° C. and humidity of 95 percent for four hours, and the weight increase ratio was determined using the following formula.

$$\textit{Weight increase ratio (\%)} = \frac{(\text{Weight after hygrostat} - \text{Weight prior to hygrostat})}{\text{Weight prior to hygrostat}} \times 100 \quad \text{Formula 2}$$

REFERENCE EXAMPLE 1

A silicone resin powder was obtained by hydrolyzing methyltrichlorosilane. It consisted exclusively of siloxane units $CH_3SiO_{3/2}$. The silicone resin powder had a volatile component content of 2.3 weight percent, an average particle size of 20 μm, a hygroscopicity of 1.1 percent. The drying conditions used during preparation of the silicone resin powder were 140° C. for four hours. The silicone resin powder was heated for one hour at 270° C., and the volatile component content of the resulting silicone resin powder obtained under these high temperature conditions was 0.1 weight percent. Its hygroscopicity was 0.45 percent.

APPLICATION EXAMPLE 1

1,000 gram of a dimethylpolysiloxane with a kinematic viscosity of 30,000 mm²/s having both its terminals end-blocked with trimethylsiloxy groups, and 790 gram of the silicone resin powder obtained in Reference Example 1, having an average particle size of 20 μm, a volatile component content of 0.1 weight percent, and a hygroscopicity of 0.45 percent, were placed in a mixer. A vibration damping silicone composition was prepared by kneading these ingredients at 150 rpm for two hours under a reduced pressure while scraping material from the mixer wall every 30 minutes. The vibration damping properties of the composition were measured and are shown in Table 1. The storage stability of the composition was also found to be excellent, as determined by filling a pail canister with the composition, and allowing it to stand for two months. During this time, practically no oil rose to the surface.

The vibration damping properties of the composition after two months were measured, and a rate of change was determined by Formula 3. These results are also shown in Table 1.

$$\text{Rate of change } (\Delta \tan \delta) = \frac{(\tan \delta)_2 - (\tan \delta)_1}{(\tan \delta)_1} \times 100 \, (\%) \quad \text{Formula 3}$$

In Formula 3, $(\tan \delta)_1$ is the value measured at 25° C. immediately after preparation, and $(\tan \delta)_2$ is the value measured at 25° C. after allowing the composition to stand for two months.

APPLICATION EXAMPLE 2

Application Example 1 was repeated except that the kinematic viscosity of the dimethylpolysiloxane was 100,000 mm²/s, and 795 gram of the silicone resin powder was employed. The results are shown in Table 1.

APPLICATION EXAMPLE 3

Application Example 1 was repeated except that the kinematic viscosity of the dimethylpolysiloxane was 10,000 mm²/s, and 280 gram of the silicone resin powder was employed. The content in the dimethylpolysiloxane of siloxane oligomers with less than 20 silicon atoms, as determined by gas chromatography, was 400 ppm. The results are shown in Table 1.

COMPARATIVE EXAMPLE 1

1,000 gram of a dimethylpolysiloxane with a kinematic viscosity of 10,000 mm²/s having both its terminals end-blocked with trimethylsiloxy groups, and 280 gram of the silicone resin powder consisted exclusively of siloxane units $CH_3SiO_{3/2}$, having an average particle size of 20 μm, a volatile component content of 2.3 weight percent, and a hygroscopicity of 1.1 percent, were placed in a mixer. A vibration damping silicone composition was prepared by kneading these ingredients at 150 rpm for two hours under a reduced pressure while scraping material from the mixer wall every 30 minutes. The storage stability was poor because when the pail canister was filled with the composition and allowed to stand for 2 months, oil rose to the surface. The results are also shown in Table 1.

TABLE 1

|  | Vibration Damping Properties after Preparation (tan δ) | Two Months Later | |
|---|---|---|---|
|  |  | Rate of Change in Vibration Damping Properties (Δ tan δ) | External Appearance |
| Application Example 1 | 20 | −8 | No Change |
| Application Example 2 | 15 | −6 | No Change |
| Application Example 3 | 30 | −5 | No Change |
| Comparative Example 1 | 30 | −25 | Oil Came to Surface |

Because the vibration damping silicone composition of the present invention contains Component (A) and Component (B) in certain prescribed amounts, and in particular, because it includes as silicone resin powder component (B), a material with a considerably reduced content of volatile components, the composition has superior vibration damping properties and long term storage stability.

Other variations may be made in compounds, compositions, and methods described herein without departing from the essential features of the invention. The embodiments of the invention specifically illustrated herein are exemplary only and not intended as limitations on their scope except as defined in the appended claims.

What is claimed is:

1. A vibration damping silicone composition comprising (A) 100 parts by weight of a silicone oil, and (B) 10–300 parts by weight of a silicone resin powder, wherein the silicone resin powder is a solid at room temperature and wherein the silicone resin powder is dried by a process comprising heating such that it has a content of volatile components of not more than one percent by weight when tested for two hours at 200° C.

2. A composition according to claim 1 wherein the average particle diameter of the silicone resin powder is 0.1–100 μm.

3. A composition according to claim 1 in which the silicone resin is a silsesquioxane resin.

4. A composition according to claim 1 in which the silicone resin powder is dried by heating the powder at a temperature of 150–300° C. before adding it to the composition.

5. A composition according to claim 1 in which the hygroscopicity of the silicone resin powder in terms of its weight increase ratio is not more than one percent as determined by allowing the silicone resin powder to stand for four hours at a temperature of 25° C. and humidity of 95 percent.

6. A composition according to claim 1 in which the silicone oil contains not more than 1,000 parts per million of siloxane oligomers with less than 20 silicon atoms.

* * * * *